US010553911B2

(12) United States Patent
Ro

(10) Patent No.: US 10,553,911 B2
(45) Date of Patent: Feb. 4, 2020

(54) BATTERY PACK AND BATTERY DRIVING APPARATUS

(71) Applicant: Samsung SDI Co., LTD., Yongin-si, Gyeonggi-do (KR)

(72) Inventor: Huntae Ro, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 687 days.

(21) Appl. No.: 14/832,974

(22) Filed: Aug. 21, 2015

(65) Prior Publication Data
US 2016/0064776 A1 Mar. 3, 2016

(30) Foreign Application Priority Data

Aug. 26, 2014 (KR) ........................ 10-2014-0111620

(51) Int. Cl.
*H01M 10/42* (2006.01)
*H01M 10/48* (2006.01)

(52) U.S. Cl.
CPC ......... *H01M 10/425* (2013.01); *H01M 10/48* (2013.01); *H01M 2010/4278* (2013.01)

(58) Field of Classification Search
CPC ............... H01M 10/425; H01M 10/48; H01M 2010/4278
See application file for complete search history.

(56) References Cited

U.S. PATENT DOCUMENTS

| 5,514,946 A * | 5/1996 | Lin ..................... G01R 31/3655 320/150 |
| 5,680,027 A * | 10/1997 | Hiratsuka .......... G01R 31/3648 320/106 |
| 6,393,246 B2 * | 5/2002 | Tsujihara ........... G03G 15/2028 399/322 |
| 8,802,257 B2 * | 8/2014 | Kim ........................ H01M 2/34 429/61 |
| 2009/0314073 A1 * | 12/2009 | Perryman ............ F02D 41/2096 73/114.45 |
| 2011/0304299 A1 * | 12/2011 | Yang ........................ H02J 7/045 320/107 |
| 2012/0181987 A1 * | 7/2012 | Lee ........................ H02J 7/0029 320/128 |
| 2013/0099757 A1 | 4/2013 | Ham |
| 2014/0203736 A1 * | 7/2014 | Kim ..................... H02J 7/0034 318/139 |

(Continued)

FOREIGN PATENT DOCUMENTS

| GB | 2476334 | * | 6/2011 | ........... G06K 19/077 |
| GB | 2476334 A | | 6/2011 | |

(Continued)

*Primary Examiner* — Jonathan Crepeau
*Assistant Examiner* — Angela J Martin
(74) *Attorney, Agent, or Firm* — Knobbe, Martens, Olson & Bear, LLP

(57) ABSTRACT

A battery pack and a battery driving apparatus are disclosed. In one aspect, the battery pack includes a battery comprising at least one battery cell, and a terminal unit configured to be connected to an external apparatus. The battery pack further includes a controller configured to control the battery, be deactivated in a shut down mode, and wake up from the shut-down mode when a voltage is applied to the terminal unit and a wake-up switch configured to electrically connect the battery and the terminal unit.

20 Claims, 6 Drawing Sheets

(56) References Cited

U.S. PATENT DOCUMENTS

2015/0035494 A1* 2/2015 Suzuki ............... H01M 10/441
320/134

FOREIGN PATENT DOCUMENTS

| KR | 10-1124097 B1 | 2/2012 |
| KR | 10-2013-0044135 A | 5/2013 |
| KR | 10-2013-0078028 A | 7/2013 |

* cited by examiner

BATTERY PACK AND BATTERY DRIVING APPARATUS

CROSS-REFERENCE TO RELATED APPLICATIONS

This application claims the benefit of Korean Patent Application No. 10-2014-0111620, filed on Aug. 26, 2014, in the Korean Intellectual Property Office, the disclosure of which is incorporated herein in its entirety by reference.

BACKGROUND

Field

The described technology generally relates to a battery pack and a battery driving apparatus.

Description of the Related Technology

Recently, due to the depletion of fossil fuels and environmental contamination, interest in products that are driven by electric power have increased. As electric power is used for many commercial applications such as mobile devices, electric cars, hybrid cars, power storage systems, and uninterruptable power supplies, the use of secondary (or rechargeable) batteries as energy sources have rapidly increased. Accordingly, secondary batteries have been undergoing development to satisfy market demand.

Generally, secondary battery technologies encompass nickel-cadmium batteries, nickel metal hydride batteries, lithium ion batteries, and lithium ion polymer batteries. They can be classified into lithium-based batteries and nickel-hydride-based batteries. Lithium-based batteries are mainly used in small products, such as digital cameras, power digital video disks (P-DVDs), MP3P, mobile phones, personal digital assistants (PDAs), portable game devices, power tools, and e-bikes, and nickel-hydride-based batteries are used with larger electrical loads that require high capacity usage, such as electric vehicles (xEVs).

SUMMARY OF CERTAIN INVENTIVE ASPECTS

One inventive aspect is a battery pack that is usable without having to be separately charged after being purchased and a battery driving apparatus including the battery pack.

Another aspect is a battery pack and a battery driving apparatus for waking up the battery pack from a shut-down mode without having to perform a separate charging process.

Another aspect is a battery pack which includes: a battery including at least one battery cell; a terminal unit to which an external apparatus is connected; a controller that controls the battery, is deactivated in a shut-down mode, and wakes up from the shut-down mode when a voltage is applied to the terminal unit; and a wake-up switch that is connected between the battery and the terminal unit.

The battery pack controller may include a wake-up terminal connected to the terminal unit. The battery pack may further include a sensor that detects an external signal and turns the wake-up switch on in response to the external signal.

The battery pack may further include a microcomputer that turns the wake-up switch off when the controller is not in the shut-down mode.

The battery pack may further include a charging switch and a discharging switch that are connected in series between the battery and the terminal unit.

The battery pack may further include a housing that protects the battery and the controller, wherein the wake-up switch may be located outside the housing.

Another aspect is a battery driving apparatus which includes: a body that includes a signal emitter emitting a wake-up signal; a battery pack that is mounted on the body; and an electric apparatus that is driven by power of the battery pack, wherein the battery pack may include: a battery including at least one battery cell; a terminal unit to which the electric apparatus is connected; a controller that controls the battery, is deactivated in a shut-down mode, and wakes up from the shut-down mode when a voltage is applied to the terminal unit; and a wake-up switch that is connected between the battery and the terminal unit.

The controller may include a wake-up terminal connected to the terminal unit. The battery pack may further include a sensor that detects the wake-up signal and turns the wake-up switch on in response to the wake-up signal.

The battery pack may further include a microcomputer that turns the wake-up switch off when the controller is not in the shut-down mode.

The battery pack may further include a charging switch and a discharging switch that are connected in series between the battery and the terminal unit. The battery pack may further include a housing that protects the battery and the controller, wherein the wake-up switch may be located outside the housing.

Another aspect is a battery pack, comprising: a battery comprising at least one battery cell; a terminal unit configured to be connected to an external apparatus; a controller configured to control the battery, be deactivated in a shut down mode, and wake up from the shut-down mode when a voltage is applied to the terminal unit; and a wake-up switch configured to electrically connect the battery and the terminal unit.

In the above battery pack, the controller comprises a wake-up terminal connected to the terminal unit. In the above battery pack, wake-up terminal is configured to receive the same voltage as the terminal unit when the wake-up switch is turned on. The above battery pack further comprises a sensor configured to detect an external signal and turn on the wake-up switch in response to the external signal. In the above battery pack, the external signal is indicative of at least one of a magnetic field, light and pressure. The above battery pack further comprises a microcomputer configured to turn off the wake-up switch when the controller is not in the shut-down mode. The above battery pack further comprises a charging switch and a discharging switch connected in series between the battery and the terminal unit.

The above battery pack further comprises a housing configured to protect the battery and the controller, wherein the wake-up switch is located outside the housing. In the above battery pack, the wake-up switch comprises a transistor or a relay configured to be turned on based on the voltage. In the above battery pack, the wake-up switch comprises a toggle switch configured to be manually turned on or off. In the above battery pack, each of the battery and terminal unit comprises a positive terminal, and wherein the wake-up switch is configured to electrically connect the positive terminal of the battery and the positive terminal of the terminal unit when the wake-up switch is turned on.

Another aspect is a battery driving apparatus, comprising: a body that comprises a signal emitter configured to emit a wake-up signal; a battery pack mounted on the body; and an electric apparatus configured to be driven by power of the battery pack, wherein the battery pack comprises: a battery comprising at least one battery cell, wherein the battery is configured to be deactivated in a shut-down mode; a terminal unit configured to be connected to an external apparatus; a controller configured to wake up the battery from the shut-down mode when a voltage is applied to the terminal unit; and a wake-up switch configured to electrically connect the battery and the terminal unit.

In the above battery driving apparatus, the controller comprises a wake-up terminal connected to the terminal unit. In the above battery driving apparatus, the battery pack further comprises a sensor configured to detect the wake-up signal and turn on the wake-up switch in response to the wake-up signal. In the above battery driving apparatus, the sensor comprises at least one of a magnetic sensor, an optical sensor and a pressure sensor. In the above battery driving apparatus, the battery pack further comprises a microcomputer configured to turn off the wake-up switch when the controller is not in the shut-down mode. In the above battery driving apparatus, the battery pack further comprises a charging switch and a discharging switch connected in series between the battery and the terminal unit. In the above battery driving apparatus, the battery pack further comprises a housing configured to protect the battery and the controller, and wherein the wake-up switch is located outside the housing.

Another aspect is a battery pack, comprising: a battery comprising at least one battery cell, wherein the battery is configured to be deactivated in a shut-down mode and activated in an active-mode; a terminal unit configured to be connected to an external apparatus; and a controller configured to change the status of the battery from the shut-down mode to the active mode when the battery is electrically connected to the terminal unit.

The above battery pack further comprises a switch configured to selectively connect the battery and terminal.

DETAILED DESCRIPTION OF CERTAIN INVENTIVE EMBODIMENTS

Figure 1:
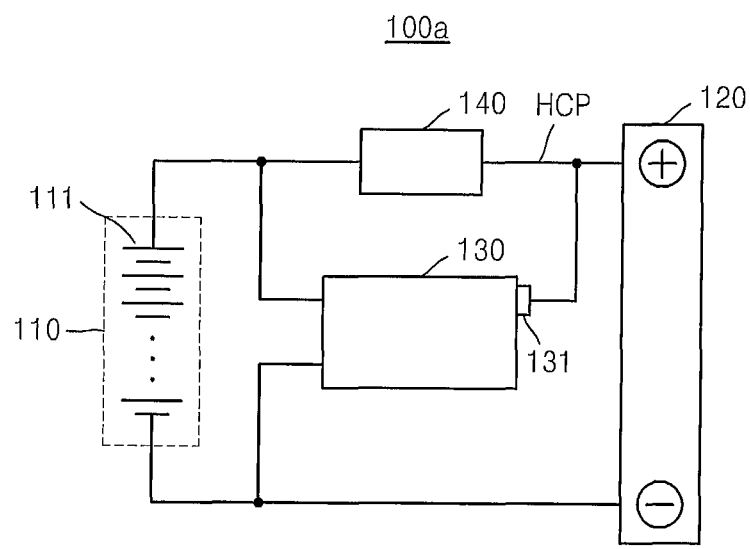
FIG. 1 is a diagram of a battery pack according to an embodiment.

A battery pack that includes a battery including at least one battery cell is normally in an active mode, a sleep mode, or a shut-down mode, and is generally placed in a shut-down mode before release to the market. Thus, to use of the battery pack requires wake up the battery pack from the shut-down mode, and such a process is generally performed by using a separate charger.

As the invention allows for various changes and numerous embodiments, particular embodiments will be illustrated in the drawings and described in detail in the written description. However, this is not intended to limit the present invention to particular modes of practice, and it will to be appreciated that all changes, equivalents, and substitutes that do not depart from the spirit and technical scope of the present invention are encompassed in the present invention.

Hereinafter, a battery pack and a battery driving apparatus using the battery pack, according to one or more embodiments will be described with reference to accompanying drawings. In drawings, like reference numerals denote like elements, and overlapping descriptions are not repeated.

When an element is "connected" to another element, the element may be directly connected to the other element, or an intervening element may exist. On the other hand, when an element is "directly connected" to another element, an intervening element does not exist. Expressions describing relationships between elements, such as "between" and "directly between" or "directly adjacent to" are interpreted in the similar manner.

Terms such as "first", "second", etc., do not have limitative meanings, but are used to distinguish one element from another. An expression used in the singular encompasses the expression in the plural, unless it has a clearly different meaning in the context. Also, it is to be understood that terms such as "including" or "having", etc., are intended to indicate the existence of the features or elements, and are not intended to preclude the possibility that one or more other features or elements may exist or may be added.

As used herein, the term "and/or" includes any and all combinations of one or more of the associated listed items. In this disclosure, the term "substantially" includes the meanings of completely, almost completely or to any significant degree under some applications and in accordance with those skilled in the art. Moreover, "formed on" can also mean "formed over." The term "connected" includes an electrical connection.

FIG. 1 is a diagram of a battery pack 100a according to an embodiment.

Referring to FIG. 1, the battery pack 100a includes a battery 110, a terminal unit 120, a controller 130, and a wake-up switch 140.

The battery 110 includes at least one battery cell 111, and the terminal unit 120 is used to connect the battery pack 100a to an external apparatus (not shown). Also, the controller 130 controls the battery 110, is deactivated in a shut-down mode, and wakes up from the shut-down mode when a voltage is applied to the terminal unit 120.

A battery pack may operate in an active mode, a sleep mode, or a shut-down mode. Also, in order to reduce power consumption, the operation mode of the battery pack changes from the active mode (e.g., 2 mA) to the sleep mode (e.g., 1 mA) and to the shut-down mode (e.g., 0.1 mA).

For example, when 1 mA is consumed per hour in the sleep mode, 4,320 mA is consumed after about 6 months, and since a charged amount of the battery pack when released is generally about 50%, if the capacity of the battery pack is 8,640 mAh, the battery pack is completely discharged after 6 months.

If a complete discharge (0%) is maintained, a battery cell is continuously deteriorated, and thus, the reliability and stability of the battery cell decreases. Accordingly, the battery pack may be released in the shut-down mode at about a level of 1.0 mA.

In order to use a battery pack from a shut-down mode, a wake-up process is performed. In order to wake up the battery pack from the shut-down mode, for example, a separate charger may be connected to the battery pack to apply a charging voltage to a terminal unit. However, if there is no separate charger, the wake-up process cannot be performed, and thus, the battery pack remains in the shut-down mode and cannot be used.

However, the battery pack 100a may be woken up without a separate charger.

The wake-up switch 140 is connected between the battery 110 and the terminal unit 120, and when turned on, connects a positive electrode (+) of the battery 110 and a positive electrode (+) of the terminal unit 120 to each other.

When a voltage of a positive terminal of the battery 110 is applied to a positive terminal of the terminal unit 120 as the wake-up switch 140 is turned on, the controller 130 wakes up from the shut-down mode. Alternatively, the controller 130 may wake up the battery pack 100a from the shut-down mode.

The controller 130 may include a wake-up terminal 131, and when a voltage is applied to the wake-up terminal 131, the controller 130 may wake up the battery pack 100a from the shut-down mode. The wake-up terminal 131 is connected to the positive terminal of the terminal unit 120, and when a voltage is applied to the positive terminal of the terminal unit 120, the same voltage is applied to the wake-up terminal 131, and thus the controller 130 may wake up from the shut-down mode.

The battery 110 supplies power to the external apparatus connected to the battery pack 100a. Also, when a charger (not shown) is connected to the battery pack 100a, the battery 110 may be charged by external power.

The battery 110 may include at least one battery cell 111, wherein the battery cell 111 may be a chargeable and/or dischargeable secondary battery, such as a nickel-cadmium battery, a lead storage battery, a nickel metal hydride battery (NiMH), a lithium ion battery, or a lithium polymer battery.

The controller 130 may control charging and discharging of the battery 110, and also control cell-balancing of the battery cell 111 included in the battery 110. Also, in order to control the battery pack 100a, the controller 130 may include at least one voltage measuring terminal (not shown) for measuring a voltage of the battery cell 111.

The battery pack 100a configured as such is charged or discharged by being connected to an external system or an external apparatus (not shown) through the terminal unit 120. Meanwhile, a path between the terminal unit 120 and the battery 110 is referred to as a high current path (HCP) as a high current flows therethrough and the HCP is used as a charging and discharging path.

The external system or the external apparatus connected through the terminal unit 120 may be an electric system or an electric apparatus, and the external system or the external apparatus may be connected to an adaptor (not shown) that separately supplies power.

When the external system and the adaptor are connected to each other, the external system may operate according to the adaptor, and the adaptor may charge the battery 110 by supplying power to the battery 110 through the terminal unit 120 through the HCP. Then, when the external system is disconnected from the adaptor, the battery 110 may be discharged to a load of the external system through the terminal unit 120.

In other words, when the external system connected to the adaptor is connected to the terminal unit 120, a charging operation is performed, and at this time, a charging path is from the adaptor to the battery 110 through the terminal unit 120.

When the adaptor is separated from the external system, a discharging operation is performed wherein power of the battery 110 is discharged to the load of the external system connected to the terminal unit 120, and at this time, a discharging path is from the battery 110 to the load of the external system through the terminal unit 120.

Figure 2:
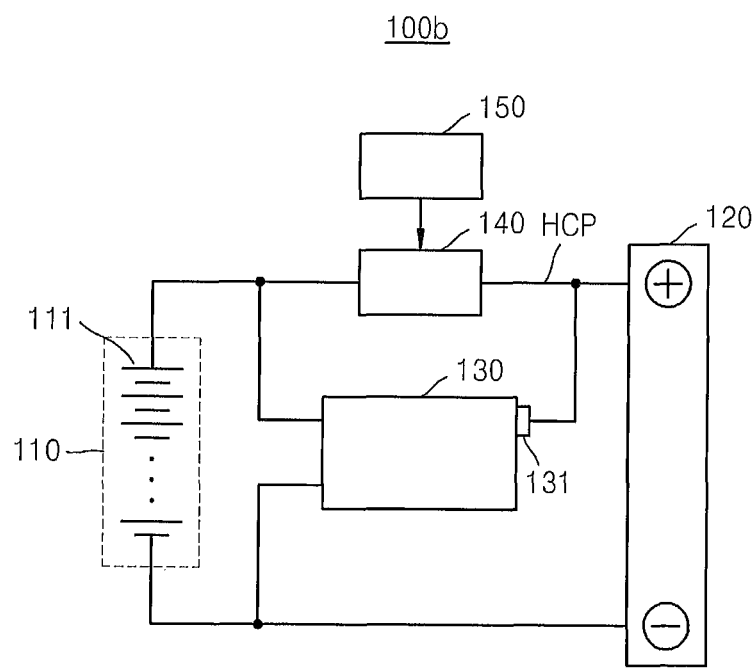
FIG. 2 is a diagram of a battery pack including a sensor according to an embodiment.

FIG. 2 is a diagram of a battery pack 100b including a sensor 150, according to an embodiment.

Referring to FIG. 2, the battery pack 100b may further include the sensor 150 that detects an external signal and turns the wake-up switch 140 on in response to the external signal.

The external signal is a signal detected by the sensor 150, the sensor 150 outputs a sensing signal in response to the external signal, and the wake-up switch 140 is turned on by the sensing signal output from the sensor 150.

When the voltage of the positive terminal of the battery 110 is applied to the positive terminal of the terminal unit 120 as the wake-up switch 140 is turned on, the controller 130 wakes up the battery pack 100a from the shut-down mode.

In some embodiments, the wake-up switch 140 remains in an off-state as long as the external signal is not detected, and the controller 130 also Maintains the shut-down mode until the external signal is detected.

The sensor 150 may be a magnetic sensor, an optical sensor, or a pressure sensor, but the sensor 150 is not limited thereto and may of another type according to a type of the external signal.

When the external signal is a magnetic field, a magnetic sensor may be used as the sensor 150, and when the external signal is light, an optical sensor may be used as the sensor 150. Similarly, when the external signal is a pressure, a pressure sensor may be used as the sensor 150. In some embodiments, one or more of a magnetic field, light and a pressure can be used as the external signal. For example, in order to wake up the battery pack 100a from the shut-down mode, a user can apply at least one of a magnetic field, light and a pressure directly or indirectly to the battery pack such that the sensor can detect the external signal.

Figure 3:
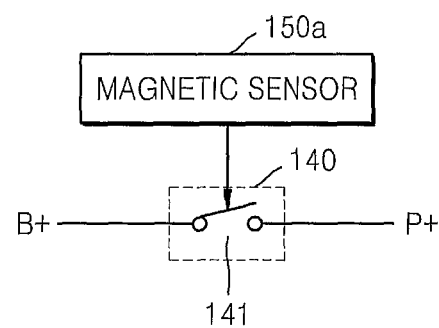
FIG. 3 is a diagram for describing an operation relationship between a sensor and a wake-up switch, according to an embodiment.

FIG. 3 is a diagram for describing an operation relationship between the sensor 150 and the wake-up switch 140, according to an embodiment.

Referring to FIG. 3, the sensor 150 may be a magnetic sensor 150a. Upon detecting an external magnetic field signal, the magnetic sensor 150a outputs a sensing signal, and the wake-up switch 140 is turned on by the sensing signal.

In FIG. 3, the wake-up switch 140 is illustrated as a general switch 141, and a voltage of a positive electrode B+ of the battery 110 is applied to a positive electrode P+ of the terminal unit 120 when the general switch 141 is closed by the sensing signal.

Figure 4:
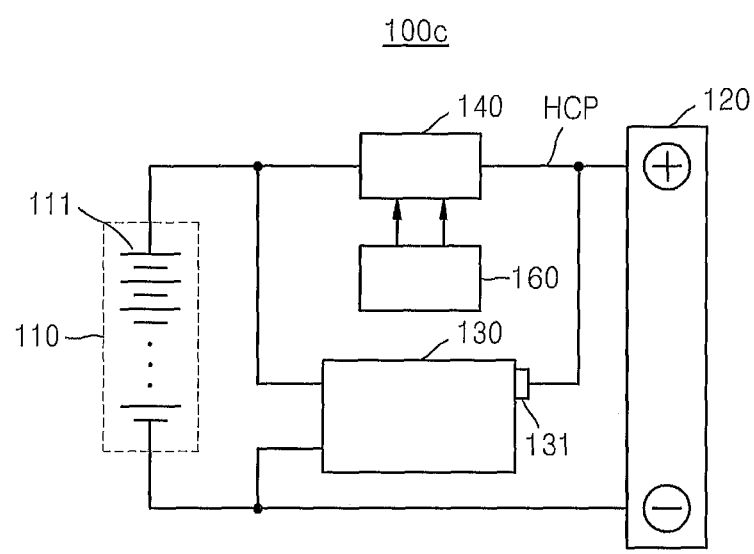
FIG. 4 is a diagram of a battery pack including a microcomputer, according to an embodiment.

FIG. 4 is a diagram of a battery pack 100c including a microcomputer 160, according to an embodiment.

Referring to FIG. 4, the battery pack 100c may further include the microcomputer 160 that turns off the wake-up switch 140 when the controller 130 is not in the shut-down mode.

As described above with reference to FIGS. 2 and 3, the wake-up switch 140 is turned on by the sensor 150 that detects the external signal and outputs the sensing signal to wake up the controller 130, and once the controller 130 wakes up according a switching operation of the wake-up switch 140, the wake-up switch 140 is turned off to protect the battery pack 100c.

In some embodiments, if the controller 130 wakes up from the shut-down mode and thus is no longer in the shut-down mode, the microcomputer 160 outputs a control signal to the wake-up switch 140 to turn off the wake-up switch 140.

Meanwhile, if the battery pack 100a or 100b does not include the microcomputer 160, the controller 130 that woke up may directly output a control signal to turn the wake-up switch 140 off.

Figure 5:
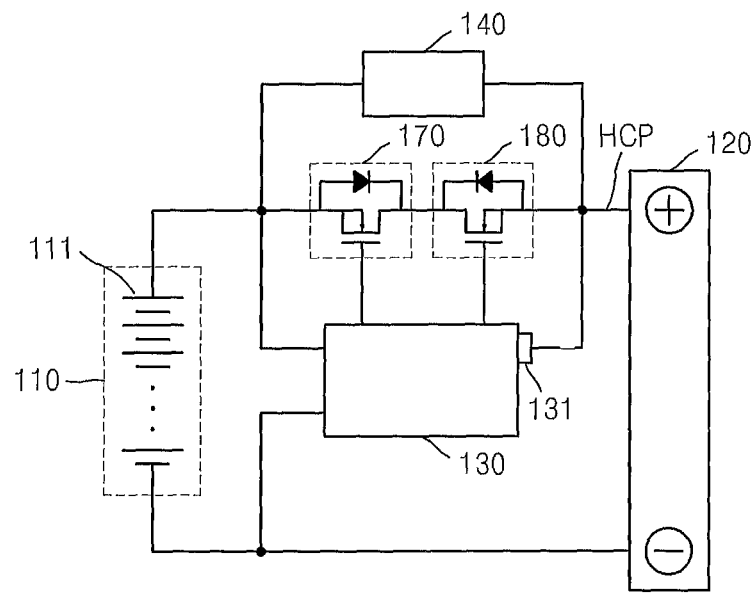
FIG. 5 is a diagram of a battery pack including a charging switch and a discharging switch, according to an embodiment.

FIG. 5 is a diagram of a battery pack 100d including a charging switch 170 and a discharging switch 180 according to an embodiment.

Referring to FIG. 5, the battery pack 100d may further include the charging switch 170 and the discharging switch 180 that are connected in series between the battery 110 and the terminal unit 120. Also, the charging and discharging switches 170 and 180 may be connected to the wake-up switch 140 in parallel.

The charging and discharging switches 170 and 180 charge and discharge the battery pack 100d by being connected in series along a HCP between the battery 110 and the terminal unit 120. The charging and discharging switches 170 and 180 may each include a field-effect transistor and a parasitic diode.

The controller 130 controls the charging and discharging switches 170 and 180. For example, when the battery 110 is in an overvoltage state, the controller 130 may turn the charging switch 170 off so that the battery 110 is not charged anymore. When the battery 110 is in a low voltage state, the controller 130 may turn the discharging switch 180 off so that the battery 110 is not discharged anymore. When the temperature of the battery 110 is high, the controller 130 may turn the charging and discharging switches 170 and 180 off to deactivate the battery 110.

The controller 130 is deactivated in the shut-down mode to reduce power consumption thereof, and the charging and discharging switches 170 and 180 may both be in an off-state. In the shut-down mode, the battery 110 may not be charged or discharged until woken up.

The battery packs 100a through 100d described above with reference to FIGS. 1 through 5 do not necessarily include only one of the components described above, such as the sensor 150, the charging and discharging switches 170 and 180, and the microcomputer 160, and may include all of the sensor 150, the charging switch 170, the discharging switch 180, and the microcomputer 160.

Figure 6A:
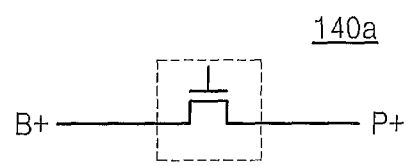
FIGS. 6A and 6B are respectively diagrams of a transistor and a relay used as wake-up switches.
Figure 6B:
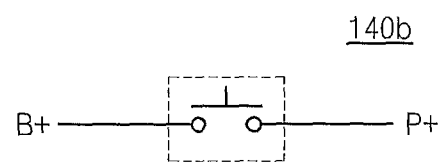

FIGS. 6A and 6B are respectively diagrams of a transistor and a relay respectively used as wake-up switches 140a and 140b.

Referring to FIG. 6, the wake-up switch 140a may be a transistor that is turned on by the sensing signal output from the sensor 150, and the voltage of the positive electrode B+ of the battery 110 may be applied to the positive electrode P+ of the terminal unit 120.

Also, as described above, since the wake-up terminal 131 of the controller 130 is connected to the terminal unit 120, the voltage of the positive electrode B+ of the battery 110 is also applied to the wake-up terminal 131 and the controller 130 wakes up from the shut-down mode.

Referring to FIG. 6B, the wake-up switch 140b may be a relay that is turned on by the sensing signal output from the sensor 150, and the voltage of the positive electrode B+ of the battery 110 may be applied to the positive electrode P+ of the terminal unit 120.

Also, as described above, since the wake-up terminal 131 of the controller 130 is connected to the terminal unit 120, the voltage of the positive electrode B+ of the battery 110 is also applied to the wake-up terminal 131 and the controller 130 wakes up from the shut-down mode.

Figure 7:
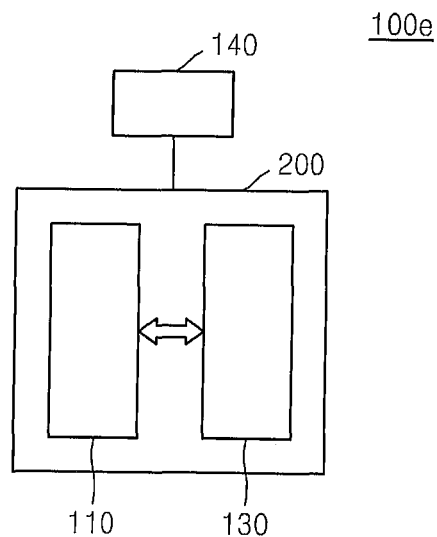
FIG. 7 is a diagram of a battery pack including a housing, according to an embodiment.

FIG. 7 is a diagram of a battery pack 100e including a housing 200, according to an embodiment.

Referring to FIG. 7, the battery pack 100e may further include the housing 200 that protects the battery 110 and the controller 130, wherein the wake-up switch 140 is located outside the housing 200.

Although not shown in FIG. 7, the battery pack 100e may include a terminal unit to which an external apparatus is connected, and may also include a microcomputer for charging and discharging switches described above with reference to FIGS. 1 through 6.

The terminal unit, the microcomputer, and the charging and discharging switches may be located inside the housing 200.

Meanwhile, as described above, the wake-up switch 140 located outside the housing 200 may perform a switching operation in response to a sensing signal output by a sensor (not shown) based on an external signal, or may be configured as a toggle switch so that a user may directly turn the wake-up switch 140 on or off.

Figure 8:
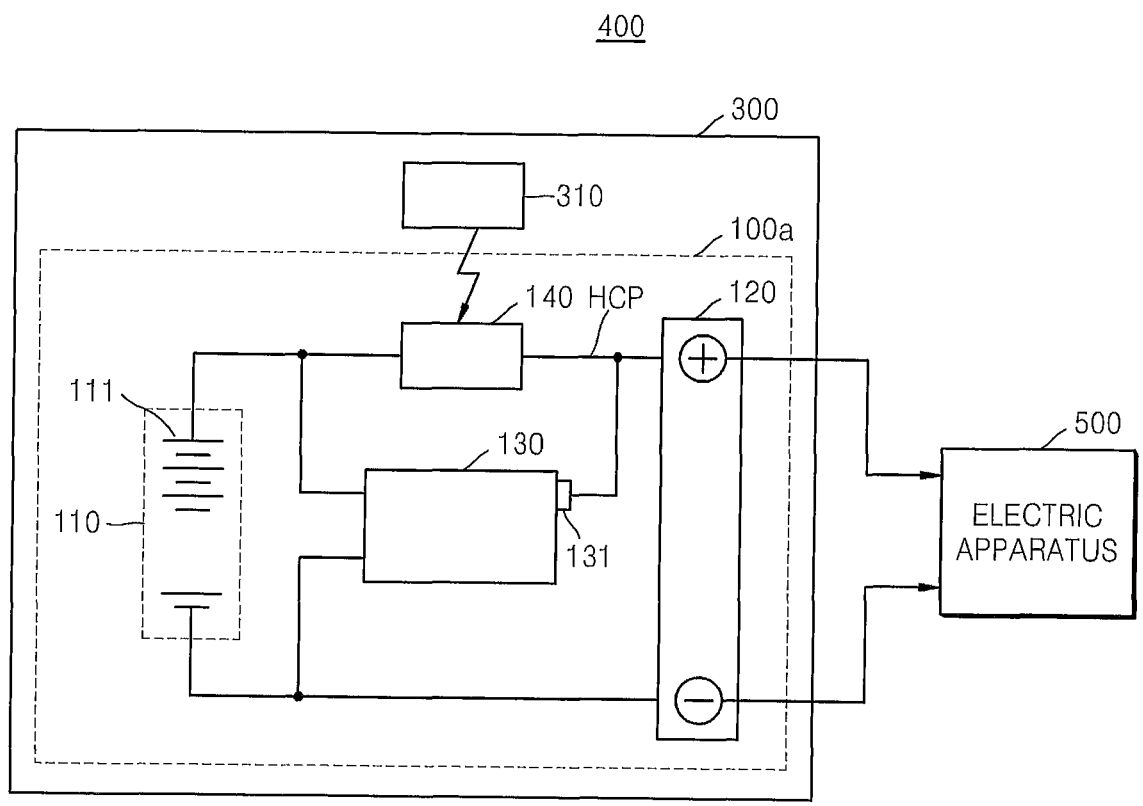
FIG. 8 is a diagram of a battery driving apparatus according to an embodiment.

FIG. 8 is a diagram of a battery driving apparatus 400 according to an embodiment.

Referring to FIG. 8, the battery driving apparatus 400 includes a body 300, the battery pack 100a, and an electric apparatus 500, wherein the battery pack 100a includes the battery 110 that includes the at least one battery cell 111, the terminal unit 120 to which the electric apparatus 500 is connected, the controller 130 that controls the battery 110, is deactivated in the shut-down mode, and wakes up from the shut-down mode when a voltage is applied to the terminal unit 120, and the wake-up switch 140 that is connected between the battery 110 and the terminal unit 120.

The body 300 includes a signal emitter 310 that emits a wake-up signal, and the battery pack 100a is mounted on the body 300. Also, the electric apparatus 500 is driven by power of the battery pack 100a.

Alternatively, the electric apparatus 500 may be driven by power received from a separate adaptor (not shown).

When the adaptor is connected to the electric apparatus 500, a charging current is supplied from the adaptor to the battery 110 through the electric apparatus 500 and the terminal unit 120, thereby charging the battery 110.

When the adaptor is not connected to the electric apparatus 500, a discharging current is supplied from the battery 110 to the electric apparatus 500 through the terminal unit 120, thereby driving the electric apparatus 500.

The controller 130 may include the wake-up terminal 131 connected to the terminal unit 120. Since the voltage of the positive electrode B+ of the battery 110 is applied to the positive electrode P+ of the terminal unit 120 when the wake-up switch 140 is turned on, the controller 130 wakes up from the shut-down mode.

Also, as described above with reference to FIG. 2, the battery pack 100a may further include a sensor (not shown) that detects an external signal and outputs a sensing signal. The external signal may be the wake-up signal emitted from the signal emitter 310, and the sensor may detect the wake-up signal and turn the wake-up switch 140 on in response to the wake-up signal.

The sensor may be a magnetic sensor, an optical sensor, or a pressure sensor, and the wake-up signal emitted by the signal emitter 310 may be a magnetic field, light, or pressure.

As described above with reference to FIGS. 3 through 7, the battery pack 100a may further include a microcomputer, charging and discharging switches, and a housing.

If the battery pack 100a further includes the microcomputer, the controller 130 wakes up according to a switching operation of the wake-up switch 140, and then the wake-up switch 140 is turned off by a control signal output by the microcomputer.

If the battery pack 100a further includes the charging and discharging switches, the charging and discharging switches may be connected in series between the battery 110 and the terminal unit 120, and may be connected in parallel to the wake-up switch 140.

After the controller 130 wakes up according to the switching operation of the wake-up switch 140, the charging and discharging switches control charging and discharging of the battery pack 100a based on whether the electric apparatus 500 is connected to the battery driving apparatus 400 and whether an adaptor (not shown) is connected to the electric apparatus 500.

If the wake-up switch is a toggle switch that is directly turned on or off by a user, the signal emitter 310 may not be included in the body 300.

Figure 9:
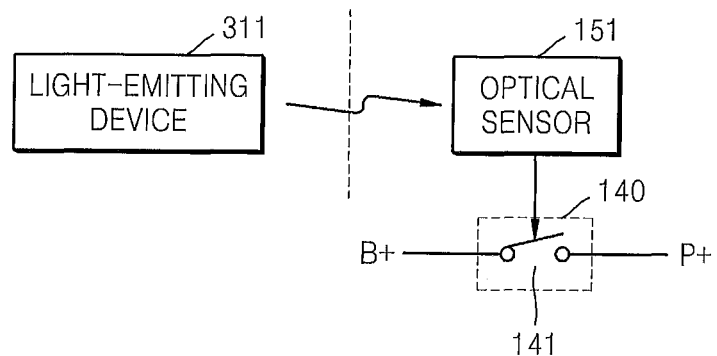
FIG. 9 is a diagram for describing an operation relationship between a signal emitter, a sensor, and a wake-up switch.

FIG. 9 is a diagram for describing an operation relationship between the signal emitter 310, the sensor 150, and the wake-up switch 140, when the battery pack 100a of the battery driving apparatus 400 of FIG. 8 includes the sensor 150.

Referring to FIG. 9, the signal emitter 310 may be a light-emitting device 311, and the sensor 150 may be an optical sensor 151. When the light-emitting device 311 emits light, the optical sensor 151 detects the light and outputs a sensing signal in response to the light. Then, the wake-up switch 140 is turned on in response to the sensing signal.

As described above, when the wake-up switch 140 is turned on by the light-emitting device 311 and the optical sensor 151, the voltage of the positive electrode B+ of the battery 110 is applied to the terminal of the positive electrode P+ of the terminal unit 120, and accordingly, the voltage of the positive electrode B+ of the battery 110 is also applied to the wake-up terminal 131 of the controller 130. Thus, the controller 130 wakes up from the shut-down mode.

The light-emitting device 311 and the optical sensor 151 are only examples for easy understanding, and the signal emitter 310 and the sensor 150 are not limited to the light-emitting device 311 and the optical sensor 151.

Accordingly, if the signal emitter 310 is a magnet, the sensor 150 may be a magnetic sensor that detects a magnetic field emitted from the magnet and outputs a sensing signal.

Alternatively, if the signal emitter 310 is an object that externally applies a pressure, the sensor 150 may be a pressure sensor that detects a pressure and outputs a sensing signal.

Figure 10:
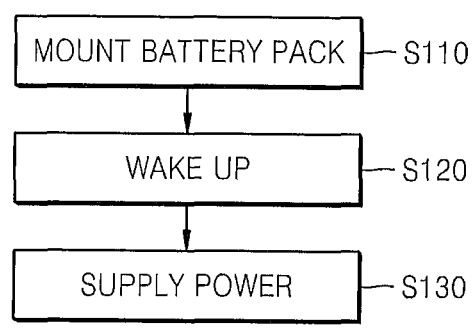
FIG. 10 is a flowchart of a battery driving method according to an embodiment.

FIG. 10 is a flowchart of a battery driving method according to an embodiment. In some embodiments, the FIG. 10 procedure is implemented in a conventional programming language, such as C or C++ or another suitable programming language. The program can be stored on a computer accessible storage medium of the battery pack, for example, a memory (not shown) of the battery pack or the controller 130. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 10.

Referring to FIG. 10, a battery driving method for driving a battery driving apparatus including a body that includes a signal emitter emitting a wake-up signal; a battery pack that is mounted on the body and includes a battery, a terminal unit, a controller, a sensor, and a wake-up switch; and an electric apparatus that is driven by power of the battery pack, the battery driving method including mounting the battery pack on the body in operation S110; waking the controller up from a shut-down mode in response to the wake-up signal in operation S120; and supplying power from the battery pack to the electric apparatus in operation S130.

The battery driving method is used to drive the battery driving apparatus 400 including the battery packs 100a through 100e described above with reference to FIGS. 1 through 9, and details about the battery driving method refer to the battery packs 100a through 100e and the battery driving apparatus 400.

Meanwhile, as described above with reference to FIGS. 3 through 7, the battery pack of FIG. 10 may further include a microcomputer, charging and discharging switches, or a housing.

The microcomputer, the charging and discharging switches, and the housing perform operations have described above with reference to FIGS. 3 through 7 and details thereof are not repeated here.

In operation S110, the battery pack is mounted on the body, and the sensor included in the battery pack detects the wake-up signal emitted from the signal emitter included in the body.

In operation S120, the sensor outputs a sensing signal in response to the wake-up signal, and the wake-up switch is turned on by the sensing signal.

When the wake-up switch is turned on, a voltage of the battery is applied to the terminal unit, and the controller connected to the terminal unit wakes up from the shut-down mode.

In operation S130, power is supplied from the battery to the electric apparatus unless an external apparatus, such as an adaptor that separately supplies power, is connected to the electric apparatus.

Meanwhile, the signal emitter may emit a magnetic field, light, or pressure, and accordingly, the sensor may be a magnetic sensor, an optical sensor, or a pressure sensor.

Figure 11:
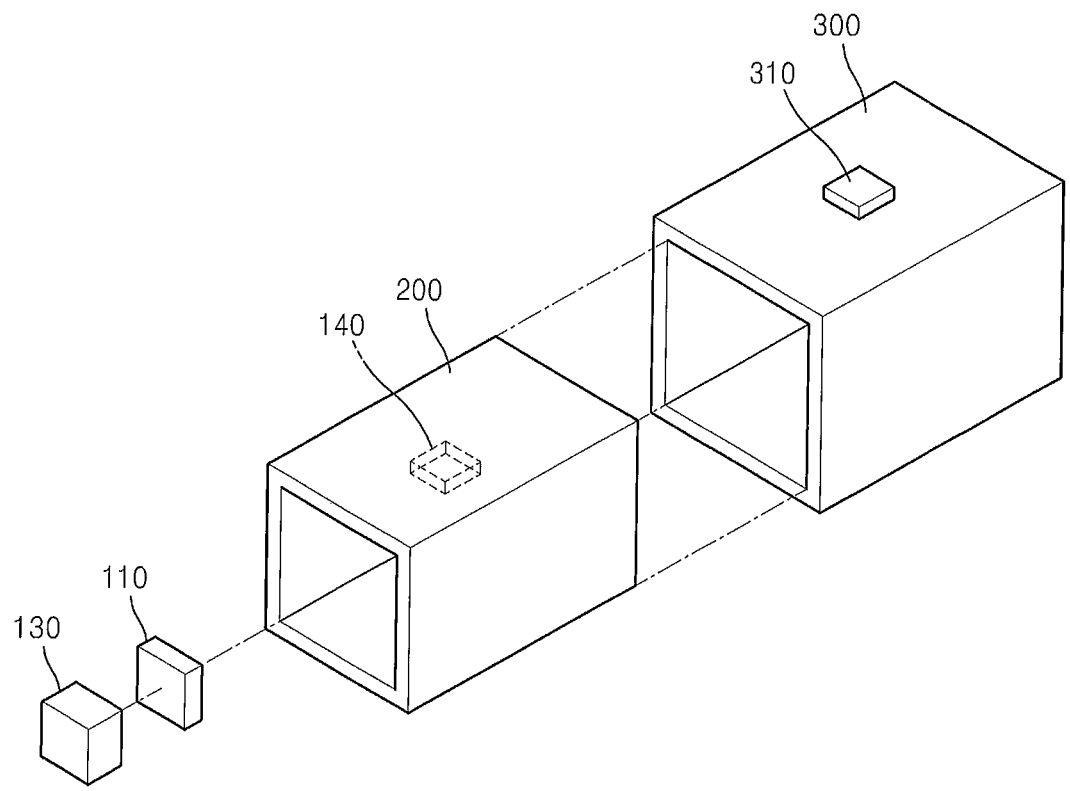
FIG. 11 is a diagram for describing a process of assembling a body, a housing, a battery, and a controller, according to an embodiment.

FIG. 11 is a diagram for describing a process of assembling the body 300, the housing 200, the battery 110, and the controller 130, according to an embodiment of the present invention.

Referring to FIG. 11, the body 300 may include the signal emitter 310 that emits the wake-up signal, and the housing 200 may be mounted on the body 300. The wake-up switch 140 may be located inside or outside the housing 200. Also, the battery 110 and the controller 130 may be mounted inside the housing 200, and the battery 110, the terminal unit 120, the wake-up switch 140, and the housing 200 form a battery pack.

Also, although not shown in FIG. 11, the battery pack may further include a sensor that detects the wake-up signal emitted from the signal emitter 310 and outputs a sensing signal. At this time, a location of the sensor corresponds to a location of the signal emitter 310 included in the body 300.

Accordingly, when the battery pack is mounted on the body 300, the sensor detects the wake-up signal emitted from the signal emitter 310 to emit the sensing signal to the wake-up switch 140, and the wake-up switch 140 is turned on in response to the sensing signal.

The battery pack may further include a terminal unit that is connected to an external electric apparatus (not shown), and the housing 200 and the body 300 may each include at least one external terminal (not shown) connected to the external electric apparatus.

If the wake-up switch 140 is a toggle switch that is directly turned on or off by a user, the signal emitter 310 may not be included in the body 300.

As described above, according to a battery pack and a battery driving apparatus and method according to the one or more embodiments of the present invention, the battery pack may be woken up from a shut-down mode without a separate charging process.

While the inventive technology has been described with reference to the figures, it will be understood by those of ordinary skill in the art that various changes in form and details may be made therein without departing from the spirit and scope of the present invention as defined by the following claims.

What is claimed is:

1. A battery pack, comprising:
   a battery comprising at least one battery cell;
   a terminal unit configured to be connected to an external apparatus;
   a charging switch and a discharging switch connected in series between the battery and the terminal unit;
   a controller configured to control the battery, be deactivated in a shut down mode, and wake up from the shut-down mode when a voltage of the battery is applied to the terminal unit; and
   a wake-up switch electrically connecting the battery and the terminal unit, wherein the wake-up switch is different from the charging switch and the discharging switch, and wherein the wake-up switch includes first and second ends opposing each other and respectively connected to the charging switch and the discharging switch.

2. The battery pack of claim 1, wherein the controller comprises a wake-up terminal connected to the terminal unit.

3. The battery pack of claim 2, wherein the wake-up terminal is configured to receive the same voltage as the terminal unit when the wake-up switch is turned on.

4. The battery pack of claim 1, further comprising a sensor configured to detect an external signal and turn on the wake-up switch in response to the external signal.

5. The battery pack of claim 4, wherein the external signal is indicative of at least one of a magnetic field, light and pressure.

6. The battery pack of claim 1, further comprising a microcomputer configured to turn off the wake-up switch when the controller is not in the shut-down mode.

7. The battery pack of claim 1, further comprising a housing configured to protect the battery and the controller, wherein the wake-up switch is located outside the housing.

8. The battery pack of claim 1, wherein the wake-up switch comprises a transistor or a relay configured to be turned on based on the voltage.

9. The battery pack of claim 1, wherein the wake-up switch comprises a toggle switch configured to be manually turned on or off.

10. The battery pack of claim 1, wherein each of the battery and terminal unit comprises a positive terminal, and wherein the wake-up switch is configured to electrically connect the positive terminal of the battery and the positive terminal of the terminal unit when the wake-up switch is turned on.

11. A battery driving apparatus, comprising:
    a body that comprises a signal emitter configured to emit a wake-up signal;
    a battery pack mounted on the body; and
    an electric apparatus configured to be driven by power of the battery pack,
    wherein the battery pack comprises:
       a battery comprising at least one battery cell;
       a terminal unit configured to be connected to an external apparatus;
       a charging switch and a discharging switch connected in series between the battery and the terminal unit;
       a controller configured to control the battery, be deactivated in a shut down mode, and wake up from the shut-down mode when a voltage of the battery is applied to the terminal unit; and
       a wake-up switch electrically connecting the battery and the terminal unit, wherein the wake-up switch is different from the charging switch and the discharging switch, and wherein the wake-up switch includes first and second ends opposing each other and respectively connected to the charging switch and the discharging switch.

12. The battery driving apparatus of claim 11, wherein the controller comprises a wake-up terminal connected to the terminal unit.

13. The battery driving apparatus of claim 11, wherein the battery pack further comprises a sensor configured to detect the wake-up signal and turn on the wake-up switch in response to the wake-up signal.

14. The battery driving apparatus of claim 11, wherein the sensor comprises at least one of a magnetic sensor, an optical sensor and a pressure sensor.

15. The battery driving apparatus of claim 11, wherein the battery pack further comprises a microcomputer configured to turn off the wake-up switch when the controller is not in the shut-down mode.

16. The battery driving apparatus of claim 11, wherein the battery pack further comprises a charging switch and a discharging switch connected in series between the battery and the terminal unit.

17. The battery driving apparatus of claim 11, wherein the battery pack further comprises a housing configured to protect the battery and the controller, and wherein the wake-up switch is located outside the housing.

18. The battery pack of claim 1, wherein the controller is configured to wake up from the shut-down mode without the use of a separate charger.

19. The battery pack of claim 1, wherein a positive terminal of the battery is configured to be connected to a positive terminal of the terminal unit when the wake-up switch is turned on.

20. The battery pack of claim 1, wherein the charging switch is connected to the battery via a first line having a first node thereon and the discharging switch is connected to the terminal unit via a second line having a second node, thereon, wherein the controller is directly connected to both the first node and the second node, and wherein the wake-up switch is directly connected to both the first node and the second node.

\* \* \* \* \*